(12) United States Patent
Filipe et al.

(10) Patent No.: US 6,394,051 B1
(45) Date of Patent: May 28, 2002

(54) SPARK IGNITION ENGINE WITH NEGATIVE VALVE-OVERLAP

(75) Inventors: David j. Filipe, Ypslanti; Robert Albert Stein, Saline, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/653,649

(22) Filed: Sep. 1, 2000

(51) Int. Cl.⁷ .............................. F01L 1/34; F01L 1/053
(52) U.S. Cl. ................... 123/90.15; 123/90.17; 123/90.27; 123/306; 60/285
(58) Field of Search ................ 123/306, 90.15, 123/90.12, 90.16, 90.27, 90.17, 491, 494, 404, 405, 686, 685; 60/276, 285, 284, 274

(56) References Cited

U.S. PATENT DOCUMENTS

| | | | |
|---|---|---|---|
| 4,327,676 A | * 5/1982 | McIntire et al. | 123/90.16 |
| 4,703,734 A | 11/1987 | Aoyama et al. | 123/432 |
| 4,892,067 A | 1/1990 | Paul et al. | 123/90.16 |
| 5,228,422 A | 7/1993 | Wakeman | 123/432 |
| 5,483,946 A | 1/1996 | Hamburg et al. | 123/686 |
| 5,588,411 A | 12/1996 | Kreuter et al. | 123/90.15 |
| 5,992,143 A | * 11/1999 | Manaka et al. | 60/285 |

* cited by examiner

Primary Examiner—William C. Doerrler
Assistant Examiner—Hieu T. Vo
(74) Attorney, Agent, or Firm—Carlos E. Hanze

(57) ABSTRACT

An internal combustion engine valve control system for improving automotive cold-starts. A "negative" valve-overlap (NVO) time period is created during a first part of each piston's intake stroke wherein, with the intake and exhaust valves closed, a high vacuum is produced in its associated cylinder. As the intake valve starts to open at the end of the period an initial small low-lift valve gap creates a high-pressure differential across the gap increasing the velocity of the air/fuel charge being injected through the gap. The added velocity elevates turbulent mixing intensity in the cylinder enhancing atomization and vaporization of the charge, improving distribution in the combustion chamber for charge stability. This allows additional spark retard and a leaner air/fuel ratio, achieving rapid catalyst warm-up, while promoting converter efficiency and reducing exhaust-gas emissions.

10 Claims, 2 Drawing Sheets

SPARK IGNITION ENGINE WITH NEGATIVE VALVE-OVERLAP

FIELD OF THE INVENTION

The present invention relates to automotive-type engine valve control systems and, more specifically, to a system for achieving a rapid warm-up of the catalytic converter during cold-starts to reduce tailpipe emissions.

BACKGROUND OF THE INVENTION

Conventional automotive engines maintain a fixed lift, duration, and phasing of intake and exhaust valve events. As a result, there is a compromise between the best fuel economy, emission control, and engine power conditions. It is known that objectives such as improved fuel economy, emission control, and other engine output benefits can be realized if the timing of these valve events are varied depending upon the engine operating mode. The present invention is directed to a cold-start system of phase shifting the intake and exhaust valve camshafts with a unique strategy to reduce catalyst warm-up time thereby minimizing tailpipe emissions.

Prior art U.S. Pat. No. 5,588,411 discloses a system for retarding the opening of at least one intake valve during cold-starts to increase the velocity and mixing of the charge. The U.S. Pat. No. 5,228,422 concerns a method for intake valve control in a fuel injected engine to improve air/fuel mixture preparation in relation to cold-starts and warm-up. The U.S. Pat. No. 4,892,067 teaches retarding the intake valve opening to increase turbulence and mixing between fuel and air but does not employ such strategy at engine start-up.

Referring to prior art FIG. 1, a simplified cross-sectional view of an automotive engine cylinder 10', together with two of its valves, illustrates a known valve-overlap timing sequence. The cylinder inlet valve seat 12' communicates with an Air/fuel inlet port 14' while its exhaust valve seat 16' communicates with its exhaust valve port 18'. Cylinder inlet valve 20' and exhaust valve 22' control their respective inlet 12' and exhaust 16' valve seats. Reciprocating piston 24' is shown at its top dead center (TDC) position on completion of its exhaust stroke. In the known valve-overlap timing arrangement, the total valve-overlap crank-angle movement when both inlet and exhaust valves are open simultaneously in the piston TDC region between piston exhaust and intake strokes, is called the valve-overlap period.

The prior art FIG. 5 valve timing diagram shows exhaust valve opening and closing event arc 30' and intake valve opening and closing event arc 32'. Exhaust event arc 30' indicates exhaust valve 22' opening at about 58 degrees before bottom dead center (BDC) and closing at about 10 degrees after TDC. Intake valve arc 32' indicates intake valve 20' opening at about 10 degrees before TDC and closing at about 58 degrees after BDC. Thus, the total valve-overlap movement 34' is about 20 degrees.

FIG. 1 depicts the valve overlap period 34' creating an exhaust gas back-flow, which is drawn into the intake port 14' via cylinder combustion chamber 26'. In prior art FIG. 2, the direction arrow 28' indicates movement of the piston 24' to a downward location from TDC, wherein the exhaust valve has closed and a low velocity air/fuel charge in-flows into the cylinder via the intake valve 20'. The low velocity intake charge results in incomplete mixing of the air and fuel, causing poor combustion stability.

The effects of poor in-cylinder mixing may be reduced by injecting fuel into the intake port during a period when the intake valve is closed. Such direct injection, however, results in extensive port wall-wetting, causing difficulty in controlling the cylinder air/fuel ratio during throttle transients, resulting in poor catalytic converter efficiency. While it is difficult to calibrate fuel compensation during cold-starting transients because of port wall-wetting, it will be noted that such wetting is an order of magnitude higher during cold-starts than under fully warmed-up conditions.

SUMMARY OF THE INVENTION

A feature of the invention is to provide an automotive engine variable valve control cold-start system wherein the intake valve opening is delayed a predetermined period after the exhaust valve has closed with both valves within the piston intake stroke region. Thus, both the intake and exhaust valves are closed during a predetermined crank-angle movement in the piston stroke region. This period, which is defined by the inventors as the "negative" valve-overlap (NVO) period, functions to improve atomization and vaporization of the air/fuel charge entering the cylinder in a manner to be explained below.

Another feature of the invention is that as the piston descends during a first portion of its intake stroke, the NVO period starts, wherein a high-vacuum is created in the cylinder. On completion of the NVO period, the intake valve starts its valve-lift phase by starting to open, creating a slight gap. The pressure difference across the low-lift of the intake valve achieves a high velocity in-flow through the valve gap into the cylinder. Such a high velocity flow increases turbulence causing increased mixing of the air/fuel charge in the chamber, thereby improving combustion stability, which allows a leaner mixture together with an increase in spark retardation during cold-starts. The spark retard operates to raise the exhaust gas temperature, achieving rapid catalyst warm-up for reducing tailpipe emissions.

In conventional engines, air/fuel ratio excursions during throttle transients result in poor catalyst efficiency. With NVO, however, the increased mixing induced by the air/fuel charge high turbulence allows open-valve port fuel injection timing to be used under cold-start conditions. Open-valve injection minimizes the amount of port wall-wetting, thereby reducing air/fuel ratio excursions caused by throttle transients, improving catalyst warm-up efficiency during cold-starts.

BRIEF DESCRIPTION OF THE DRAWINGS

The object and advantages described herein will be more fully understood by reading examples of the embodiments in which the invention is used to advantage, referred to herein as the Description of the Preferred Embodiments, with reference to the drawings wherein.

DETAILED DESCRIPTION OF THE PREFERRED EMBODIMENTS

Figure 1:
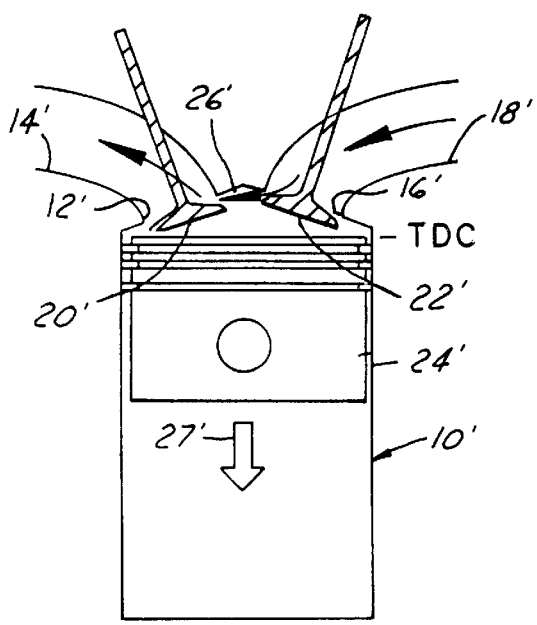
FIG. 1 is a prior art fragmentary sectional view, partly in elevation, schematically depicting an engine cylinder with its piston at TDC, at the start of its intake stroke.
Figure 3:
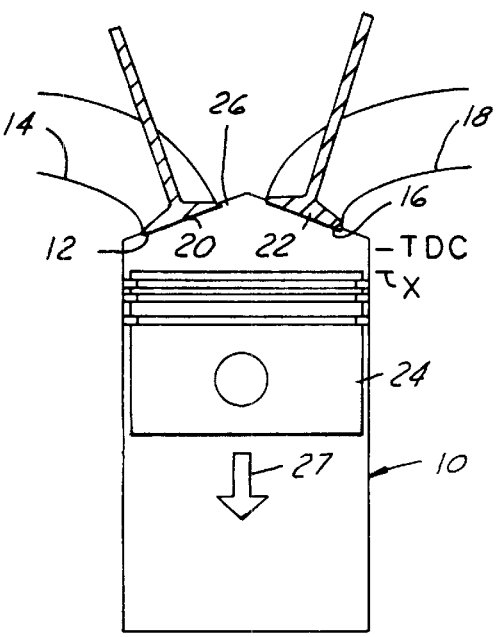
FIG. 3 is a view like FIG. 1, showing a first embodiment of the invention, with the piston moved slightly downward from TDC to an "X" position.
Figure 2:
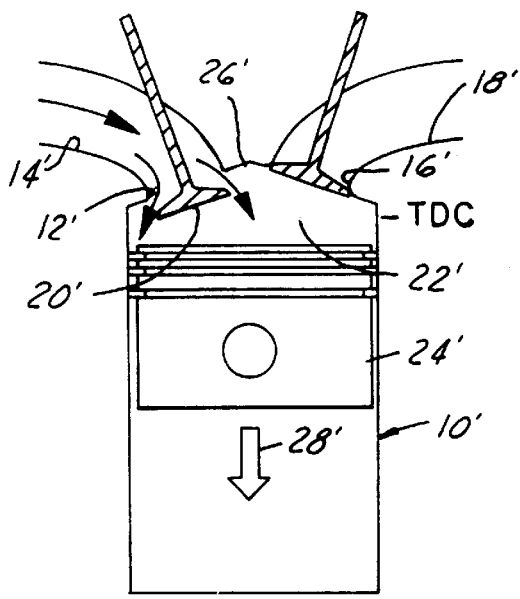
FIG. 2 is a view of prior art FIG. 1, after the piston has moved slightly downward from its FIG. 1 position.
Figure 4:
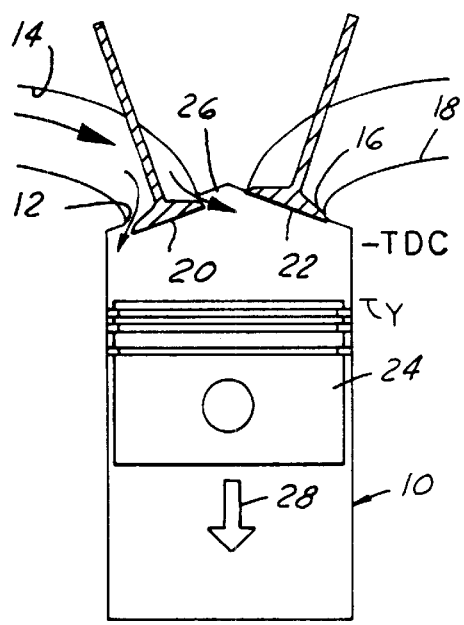
FIG. 4 is a view like FIG. 3, showing the piston moved further downward to a "Y" position.
Figure 5:
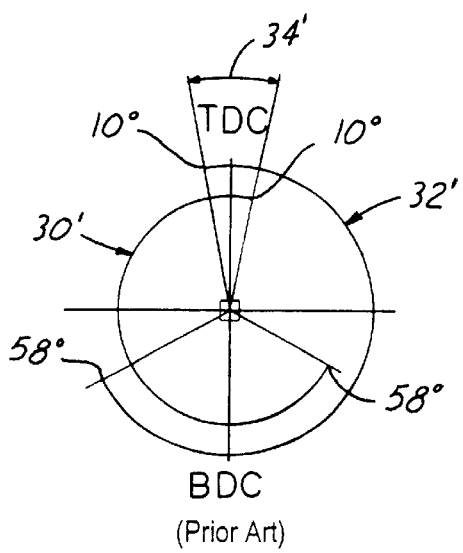
FIG. 5 is a prior art circular valve timing diagram of the FIGS. 1 and 2 known valve-overlap.
Figure 6:
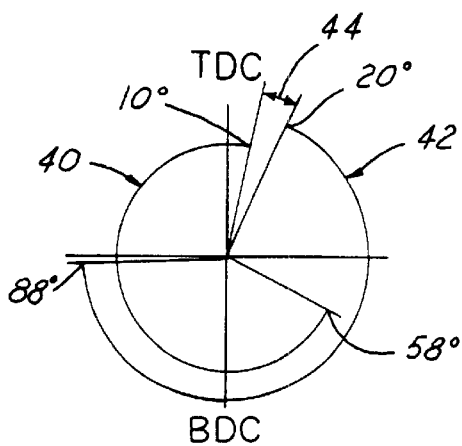
FIG. 6 is a circular valve timing diagram of the FIGS. 3 and 4 "negative" valve-overlap embodiment.

Turning now to FIGS. 3,4 and 6 involving a first engine NVO cold-start embodiment of the invention, wherein only the intake valve 20 undergoes variable camshaft timing during an engine cold-start sequence. The cold-start valve sequence, in one form, is triggered each time the engine is started and continues until a canceling occurrence such as a predetermined temperature is attained. As an example, a canceling temperature may be upon the catalytic converter reaching its "light-off" temperature, i.e. when the catalyst is 50% effective in removing specified emissions. An alternative canceling temperature could be upon an engine thermostat sensing a predetermined engine coolant temperature (ECT). Reference may be made to U.S. Pat. No. 5,483,946 which discusses an engine control for rapid catalytic warm-up employing ECT.

FIG. 3 depicts cylinder piston 24 after a slight downward crank-angle movement from TDC of the piston intake stroke to an "X" location, where exhaust valve 22 has just closed at about 10 degrees past TDC and the intake valve remains closed. In the circular valve timing diagram of FIG. 6, the exhaust valve opening and closing event arc 40 shows the exhaust valve 22 reaching its closed state at a crank-angle movement of approximately 10 degrees after TDC during the intake stroke. The intake valve event arc 42 displays a camshaft phase shift during a cold-start, wherein the intake valve-lift starts about 20 crank-angle degrees after TDC during the piston's intake stroke, i.e. its initial valve-lift is retarded about 10 crank-angle degrees beyond the closing of exhaust valve 22. The total crank-angle movement between the 10 degree exhaust valve closing point, as seen on the event arc 40 and the 20 degree intake valve opening point, as seen on the event arc 42, is defined herein as the "negative" valve-overlap period. Reference numeral 44 indicates this NVO period is about 10 crank-angle degrees, which causes a high-vacuum to be drawn in the cylinder.

At the end of the NVO period the intake valve 20 defines a slight low-lift valve gap, shown in FIG. 4, wherein the high vacuum in the cylinder induces a pressure difference across the intake valve gap. This pressure difference creates a high velocity in-flow of the charge through the intake valve gap, defined between valve seat 12 and valve 20. During this time interval the charge in-flows into the chamber 26, indicated by the pair of arrows, while piston 24 has moved downward to a position "Y". The in-flow increases the turbulence intensity resulting in enhanced mixing throughout the intake port injected air/fuel charge, improving the combustion stability of the charge. Further, such mixing allows the control system to increase spark-retard and enables the use of a leaner air/fuel ratio in the cylinder for rapid catalyst warm-up, thereby reducing tailpipe emissions.

Figure 7:
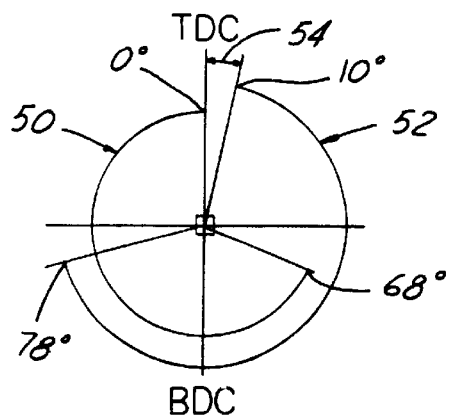
FIG. 7 is a circular valve timing diagram of a second "negative" valve-overlap embodiment.

Referring to FIG. 7, a second embodiment involves NVO on a dual overhead camshaft engine with dual independent camshaft phase-shift, i.e. variable camshaft timing, wherein the exhaust valve camshaft is slightly advanced from its base timing. As seen by exhaust valve event arc 50, timing for opening the exhaust valve 22 is about 68 degrees before BDC, while its closing is at or slightly past TDC minimizing exhaust residual fraction. The intake valve camshaft is significantly retarded from its base timing, causing its delayed valve-lift gap at about 10 degrees past TDC, indicated by its event arc 52.

It will be noted that the FIG. 7 embodiment is an improvement over FIG. 6 in that its intake valve 20 opens ten degrees closer to TDC, resulting in its closure at 78 degrees past BDC instead of 88 degrees as in FIG. 6. Thus, the FIG. 7 embodiment provides an increased effective compression ratio which increases the compression heating of the fresh charge, thereby improving combustion stability allowing additional spark retard. As a result of the spark retard, rapid catalytic warm-up is achieved, such as the occurrence of a predetermined "light-off" temperature being attained.

Figure 8:
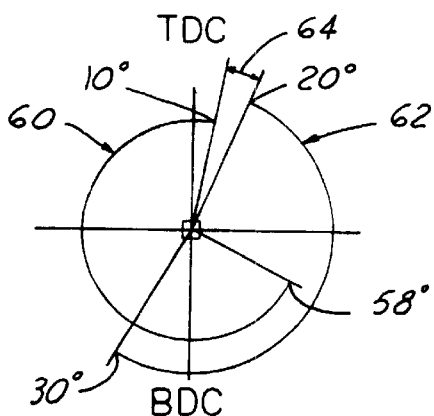
FIG. 8 is a circular valve timing diagram of a third "negative" valve-overlap embodiment.

The valve timing diagram of FIG. 8 involves a NVO valve sequence which provides a dual intake valve event or duration, i.e. how long the valve stays open. The NVO period at start-up combines the dual intake event with intake valve only variable cam timing. In this case, the exhaust event arc 60 indicates the exhaust valve is timed to open at about 58 degrees before BDC and timed to close at about 10 degrees beyond TDC. The short intake valve event arc 62, however, has the intake valve timed to open at about 20 degrees past TDC but timed to close at about 30 degrees beyond BDC. This relatively early intake valve closing achieves a high effective compression ratio; i.e. the maximum cylinder volume at BDC is 9 to 1 times as large as the minimum cylinder volume at TDC. The latter increases the compression heating of the fresh charge, which improves combustion stability.

Figure 9:
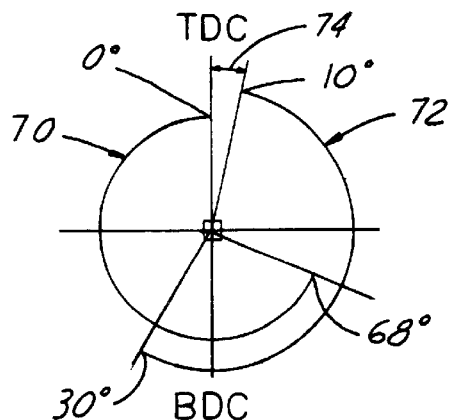
FIG. 9 is a circular valve timing diagram of a fourth "negative" valve-overlap embodiment.

The FIG. 9 NVO timing diagram concerns a short intake valve timing event sequence with dual independent variable camshaft timing. Exhaust event arc 70 indicates the exhaust valve-lift gap opening at about 68 degrees before BDC and closing at TDC or slightly beyond. The intake valve event arc 72 indicates its camshaft timing retarded from its base timing, causing a delayed intake valve opening at about 10 degrees past TDC during the intake stroke so as to close at about 30 degrees past BDC. This embodiment provides a wide open throttle benefit by employing a short intake valve duration at low speeds and a long intake valve duration at high speeds.

While the best modes for carrying out the invention have been described in detail, those skilled in the art in which this invention relates will recognize various alternative designs and embodiments, including those mentioned above, in practicing the invention that has been defined by the following claims.

What is claimed is:

1. A valve control system for an internal combustion spark ignition engine having its exhaust coupled to a catalytic converter and at least one cylinder having a reciprocal piston together with at least one pair of intake and exhaust valves, an engine valve timing system for cold-starts comprising:

means for initiating the cold-start control system by virtue of the intake valve opening after the exhaust valve closes in the piston intake stroke region, resulting in a NVO period defined by both inlet and exhaust valves being in their closed mode simultaneously in the region for a predetermined crank-angle movement, thereby creating a high-vacuum in the cylinder; and upon completion of the NVO period the intake valve defining an initial small valve-lift gap during its opening resulting in a high-pressure differential across the gap, causing a high-velocity in-flow of the air/fuel charge through the gap, such that the in-flow enhances turbulent intensity and mixing of the charge in the cylinder so as to improve its combustion stability, enabling an increase in spark retard together with a leaner air/fuel ratio, thereby achieving rapid catalyst warm-up and improved converter efficiency reducing exhaust-gas emissions.

2. The engine valve control system of claim 1 on a dual overhead camshaft engine having variable camshaft timing on intake camshaft only, wherein during the engine cold-start sequence the exhaust valve is opened after about two-thirds of its crank-angle movement from TDC to BDC in the intake stroke region and closed at about 10 degrees of crank-angle movement beyond TDC in the intake stroke region, and the intake valve is opened about 20 degrees of crank-angle movement beyond TDC providing a NVO period of about 10 degrees of crank-angle movement.

3. The engine valve control system of claim 1 wherein the control system initiates the cold-start sequence during each engine start-up, and means for sensing the catalytic converter temperature such that upon the catalyst reaching a predetermined minimum operating temperature the system cancels the cold-start sequence; and open-intake valve port fuel injection is provided in conjunction with the NVO valve sequence.

4. The engine valve control system of claim 1 on a dual overhead camshaft engine having a dual independent camshaft phase-shift cold-start valve sequence causing the exhaust valve to close at the TDC starting point of the piston intake stroke or slightly beyond such point, and the intake valve opening is retarded a predetermined crank-angle movement past the TDC point, resulting in a predetermined NVO crank-angle period, thereby enabling an earlier intake valve closing point after BDC, whereby a higher effective compression ratio is achieved during the compression stroke thereby decreasing the time needed to warm-up the catalyst to a predetermined minimal operating temperature.

5. The engine valve control system of claim 1 on a dual overhead camshaft engine having a short intake valve duration with intake phase shift cold-start valve sequence, the exhaust valve opening at about two-thirds the crank-angle movement between TDC and BDC in the intake stroke region and closing at about 10 degrees beyond TDC in the intake stroke region, and a very short intake valve event providing a relative early timing after BDC to achieve a high effective compression ratio increasing the compression heating of the fresh charge, thereby further reducing the time to warm-up the catalyst.

6. The engine valve control system of claim 5 having dual independent variable camshaft timing, thereby providing a wide open throttle benefit by employing a short intake valve duration at low speed and a long intake valve duration at high speed.

7. The engine valve control system of claim 1 wherein open-valve port fuel injection timing is adapted to be used in conjunction with NVC during the cold-start sequence by virtue of the increased mixing of the air/fuel charge resulting from the NVO induced high turbulence intensity.

8. A valve control method for an internal combustion spark ignition engine having its exhaust coupled to a catalytic converter and at least one cylinder having a reciprocal piston together with at least one pair of intake and exhaust valves, the valve timing sequence steps comprising:

closing the exhaust valve in the piston intake stroke region;

delaying the opening of the intake valve opening by a predetermined crank-angle movement beyond the point of closure of the exhaust valve, such that both the inlet and exhaust valves are simultaneously in a closed mode defining a NVO period creating a high-vacuum in the cylinder;

commencing the intake valve-lift upon completion of the NVO period thereby developing a pressure differential across an initial narrow valve-lift gap causing a high-velocity air/fuel charge to flow through the gap into the cylinder, enhancing the mixing of air with the injected fuel by means of the high velocity air/fuel charge flow producing increased turbulence in the cylinder combustion chamber while improving atomization and vaporization of the mixture, resulting in improved combustion stability, so as to allow an increase in spark retardation and the use of a leaner air/fuel ratio, thereby achieving rapid warm-up of the catalyst with reduced tailpipe emissions.

9. The method of claim 8 including the step of initiating open-intake valve port fuel injection in conjunction with the NVO cold-start valve sequence.

10. The method of claim 8 including the step of initiating the cold-start NVO valve sequence upon engine start-up, and wherein upon sensing a predetermined minimum temperature the cold-start valve sequence is cancelled.

* * * * *